Dec. 10, 1963    E. DASH    3,114,031
WELDING STUD FOR ELECTRIC ARC WELDING
Original Filed Jan. 29, 1959
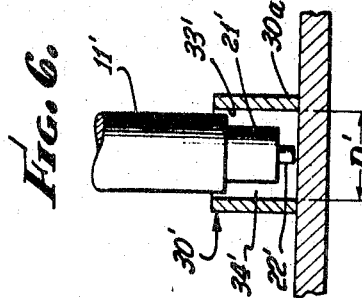
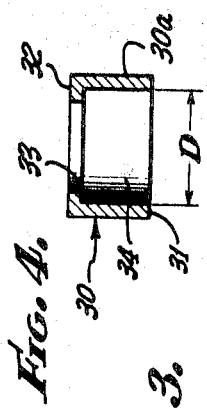
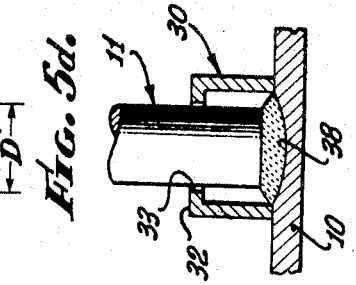
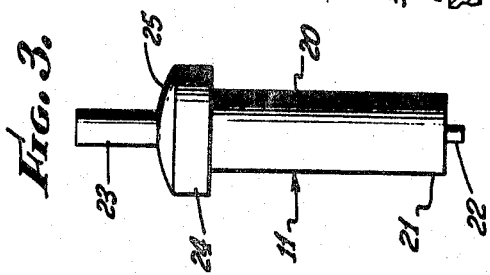
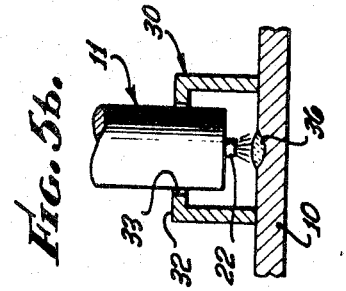
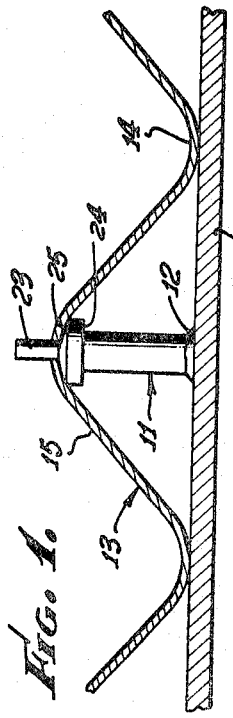
INVENTOR.
Edward Dash

United States Patent Office 3,114,031
Patented Dec. 10, 1963

3,114,031
WELDING STUD FOR ELECTRIC ARC
WELDING
Edward Dash, 710 W. Columbia St., Long Beach 6, Calif.
Application Jan. 29, 1959, Ser. No. 790,014, now Patent
No. 3,004,139, dated Oct. 10, 1961, which is a division
of application Ser. No. 581,358, Apr. 30, 1956, now
abandoned. Divided and this application Mar. 3, 1961,
Ser. No. 93,072
7 Claims. (Cl. 219—99)

This invention relates to a welding stud for electrical arc stud welding and more particularly to a welding stud which is used with a welding ferrule and which has an unfluxed welding end with a projection tip. This invention also relates to a welding stud construction for use with corrugated sheet like roofing and siding members to secure such sheet like members in weathertight, non-rattling relation on supporting frame members.

This application is a divisional application of my co-pending application Serial No. 790,014, entitled "Welding Stud and Ferrule Construction for Electrical Arc Welding," filed January 29, 1959, now Patent No. 3,004,139 dated October 10, 1961. The latter copending application was divided out of my original application Serial No. 581,458, filed April 30, 1956, entitled "Welding Stud Construction and Method of Arc Welding," now abandoned.

Corrugated roofing and siding sheet-like members heretofore have been secured to supporting frame members such as purlins by the use of welding studs welded at one end to the purlin and provided with a narrow shoulder defined by a slightly reduced end portion or rivet extension at the other end of the stud. After such studs have been welded to the purlins, corrugated sheet-like members are positioned so that the crowns of the said sheet-like members rest on the welded studs. A sharp blow delivered by a rubber-headed hammer to the crown of the sheet-like member at the stud location causes a rivet extension to pierce and to be drawn through the sheet-like member and its crown. A washer may then be placed over the rivet extension of the welded stud, and the said rivet extension then is upset by hammer blows usually made with a rivet set tool. These hammer blows materially weaken the sheet-like member resting against the narrow shoulder of the stud to such an extent that often the original pierced hole in the corrugation is driven beneath the narrow shoulder provided on the stud. Such frequent failures in installation necessitate time consuming and costly repairs. Even if the original pierced hole is not immediately enlarged during the hammer blows, the weakened area of the sheet-like member often fails during service because of alternate high stresses and strains encountered during heavy winds. Thus, such prior proposed construction becomes so loose that the sheet-like member commences to rattle during even minor winds creating such loud noises within the building that personnel cannot work efficiently therein. More important, such defect of prior constructions result in water leakage during rain storms and exposure to other weather conditions existing outside the building. This defeats the original purpose of the metal roofing and siding construction for providing weather-tight shelter, and again, necessitates costly repairs.

In the above prior proposed installation of corrugated metal roofing and siding as well as in other installations, prior proposed welding studs used with refractory ferrules for stud welding have included a welding flux at the welding end of the stud in order to facilitate and accomplish the formation of a sound weld. The provision of a welding flux on a welding end required additional machining operations at the welding end, complicated manufacture of such studs, and generally increased the cost of such studs. Prior attempts at welding of a stud without welding flux and in accordance with known welding methods resulted in poor initiation and maintenance of a welding arc which caused the welding end to short circuit and to solidify to the work member prematurely thereby causing an unsound and a rejected weld.

The present invention concerns a stud construction which eliminates the objectionable features and disadvantages indicated above. The stud construction of the present invention not only eliminates installation failures of the sheet-like members when hammer riveting blows are applied but also effects better weatherproofing. The stud construction of this invention incorporates an integral projection tip which does not carry loading flux even in large stud diameters of greater than one quarter of an inch. The stud of this invention is thus economical to produce. In addition, it has been found that arc initiation and maintenance by these studs are superior, the arc being maintained in a sturdier and stronger manner with resultant stronger and more uniform welds.

The principal object of this invention is to disclose and provide a novel welding stud construction for electrical arc stud welding.

An object of this invention is to disclose and provide a welding stud for use in securing and attaching sheet-like members to supporting frame members in weathertight non-rattling relation.

Another object of this invention is to disclose and provide a welding stud construction which provides a stop means and a large bearing area for supporting opposed portions of a supported sheet-like member.

A more specific object of this invention is to disclose and provide a welding stud having a shank with a fastening end at one end and an integral upset annular support collar between the shank and the fastening end, the support collar being provided with a top curved surface facing the fastening and affording a stop and enlarged bearing area for a supported member.

A still further object of this invention is to provide a novel stud construction provided with a projection tip without flux and in which the arc is initiated and maintained in a strong and forceful manner.

A further specific object of this invention is to disclose and provide a novel stud which when employed with a ferrule by the method of this invention as described later and as claimed in a copending divisional application filed in the U.S. Patent Office as Serial No. 789,935 produces sound uniform acceptable welds without the use of flux on the welding end of the stud construction.

These and many other objects and advantages of this invention will be readily apparent from the following description and drawings of an exemplary embodiment of this invention:

In the drawings:

FIG. 1 is a fragmentary sectional view of a corrugated metal member impaled on a stud of this invention and before riveting or securing of the fastening end.

FIG. 2 is a fragmentary sectional view of a corrugated metal member secured to a frame member by a welding stud of this invention.

FIG. 3 is an elevational view of a stud embodying this invention.

FIG. 4 is a sectional view of a ferrule.

FIG. 5a, FIG. 5b, FIG. 5c and FIG. 5d are successive fragmentary views showing a welding operation with a stud and ferrule shown in FIGS. 3 and 4.

FIG. 6 is a sectional view of a modified ferrule and stud combination embodying the invention.

In FIGS. 1 and 2 is shown a siding or roof construction embodying a welding stud of this invention, such construction comprising a frame or work member 10 to which a welding stud 11 of this invention may be welded at 12 at its welding end. A corrugated sheet-like metal member 13 is secured to the work member 10 by means of a plurality of spaced welding studs 11. In the example shown, the sheet-like metal members formed with corrugations which provide a plurality of spaced parallel valleys 14 and ridges or crowns 15 suitably curved in well known manner. The top of a ridge 15 is supported by stud 11 and is impaled upon a fastening end 16 of the stud. Between the curved ridge 15 of the member 13 and the fastening end 16 may be provided a circular washer 17 which may include a curved form to correspond with the curvature of the ridge. The fastening end 16 in this example is riveted securely to the washer and the sheet-like member, but it is understood that the fastening end may include a threaded portion which may carry a nut to provide securement of the ridge to the stud.

The exemplary welding stud 11 may be made of any suitable metal such as low carbon steel and may be capable of being produced in any convenient well known manner as by automatic screw machine methods. The welding stud 11 may comprise an elongated metal shank 20 of uniform cross-section such shank being either circular, rectangular, polygonal or other suitable cross-section or shape. A welding end 21 may be provided with an integral projection tip 22 coaxial with shank 20. The exemplary welding end 21 does not carry nor is it provided with any flux material or substance normally used in welding, and such a welding end is herein referred to as being "unfluxed." In this example welding end 21 is of the same material as shank 20.

The dimensions of projection tip 22 are critical. It has been found that an exemplary projection tip 22 should be, if cylindrical, approximately $3/32$ of an inch in diameter or less, or if other than cylindrical, have an equivalent of cross-sectional area of approximately .007 square inch or less. The latter cross-sectional area of .007 square inch may obtain for any diameter or cross-sectional area of welding end 21, for studs having weld end diameters up to and including one-half of an inch. Larger weld end diameters may have somewhat larger diameter tips.

The length of projection tip 22 is a principal factor in controlling the length of the arc and in the prevention of short circuiting of the arc in the welding method of this invention as described later. Exemplary length of projection tips 22 may vary from approximately $3/64$ of an inch to $1/8$ of an inch for studs having weld end portions of diameters varying from $3/16$ inch to $7/8$ inch respectively.

The dimensions of a projection tip 22 are closely related to the cross-sectional area of a ferrule welding chamber as later described, and the amount of volume of weld metal deposited from the welding end of the stud. I have found that for optimum welds using the minimum cross-sectional areas of a ferrule chamber, the volume of metal in the projection tip would be approximately 10% or less of the total weld metal deposited, that is, the metal of the projection tip plus that metal portion (burn-off length) of the weld end which becomes molten.

While the shape of the projection tip 22 is exemplarily illustrated as having a uniform circular cross-section, it is understood that the shape of the projection tip is not critical but may be dome-shaped, cone-shaped, annular-shaped, or some other desired shape, as long as the volume of metal in the projection tip is related to the ferrule chamber, and weld metal deposited as described above and it is understood that the phrase "projection tip" includes all such different shapes and configurations. Projection tip 22 on welding end 21 serves to eliminate the necessity for a welding flux on the welding end, particularly when employed in accordance with the method of this invention described later.

At the other end of elongated shank 20 is integrally formed a fastening end 23, said fastening end being of reduced diameter, and in the example, it is provided with a cylindrical surface. It is understood that fastening end may include threads for cooperation with an associated threaded nut. The diameter of the fastening end 23 is sufficiently small so as to facilitate impaling of the sheet-like member thereupon while at the same time providing sufficient metal material for riveting said fastening end to secure the sheet-like member. It is understood that the shank 20 may be of the same or even small diameter than fastening end 23 to take advantage of the most economical production method.

Between shank 20 and fastening end 23 may be provided an annular radially outwardly extending collar or support portion 24, said annular support portion having a diameter substantially greater than that of the fastening portion 23 and of the shank 24. In an exemplary stud, the diameter of the annular support portion 24 may be approximately twice that of the shank. The annular support portion 24 is integrally formed with shank 20 and fastening end 23, and thickness of the annular support portion 24 sufficient to withstand blows of an impaling hammer. The support portion serves as a stop means having a large enough diameter and area to positively position the sheet member on the stud after the sheet members have been impaled and for affording a surface 25 facing the fastening end 23 which has sufficient bearing area to prevent further piercing, tearing, or fracture of the metal of the sheet member surrounding the pierced opening therein by hammer blows or fastening means.

The surface 25 of the upset annular support portion 24 may be shaped to conform to the curvature of the opposed portion to the sheet-like member 13. In an example, the surface 25 comprises a convex curved face which corresponds substantially to the curvature of the sheet-like metal member 13. It will thus be apparent that when the sheet-like metal member 13 is impaled over a stud of this invention, the margins of the opening provided by such impaling will conform to the curvature of the surface 25 and will be supported thereby as a snug fitting. After a washer 17 has been placed on the fastening end and the fastening end riveted it will be apparent that the resulting securement of the sheet-like member 13 to the welding stud provides a substantially leak proof connection. In addition, the support given to the sheet-like member by the annular support portion 24 together with the tight riveting at the fastening end provides a non-loosening, non-rattling construction.

The welding end 21, provided with a non-fluxed projection tip 22, may be arranged in cooperative relation with a ferrule 30 so that a stud welding operation in accordance with this invention may be performed without flux and in an improved manner. In FIG. 2, ferrule 30 may comprise a cylindrical open ended hollow body 30a provided with a plain edge face 31 which lies in a plane transverse to the axis of the ferrule body. The plain end face 31 is adapted to seat upon, in full engagement, the opposed surface of a work member 10 to which a stud 11 is to be welded. The opposite end of cylindrical body 30 is provided with an inwardly directed annular lip 32 defining an axial opening 33. The opening 33 is provided with a diameter substantially greater than the diameter of a shank 20 of a stud to be used with the ferrule so that the circular edges of lip 32 will be spaced from the cylindrical surface of a shank of a stud passed therethrough. An example of such spacing is approximately one thirty-second of an inch.

The inner diameter D of the ferrule body in its relation to a welding end 21 of stud 11 to be welded is critical. I have found that the ratio of diameter D to the diameter of the welding end of the stud should be chosen to permit molten droplets of weld metal from the welding end of the stud to spread out thinly upon the work member and not to build up in an axial direction to the extent that a short circuit of the arc may occur by premature fusion between the welding end of the stud and the deposited metal.

I have also found that if the projection tip has the proper length and the volume of metal in the projection tip is approximately ten percent or less of the total metal deposited as defined above, then a minimum ratio of 1.2 times the diameter of the welding end may be used for determining the diameter of the weld chamber and such minimum ratio of 1.2 will not produce short circuiting of a welding arc. The range of minimum ratios may lie from 1.2 to 1.8 and preferably within this range the smaller ratios may be used for large diameter studs and the larger ratios for smaller diameter studs.

I have found that if ratios greater than those described above are used, a larger burn-off from the stud becomes necessary and such results in a larger volume of weld metal being deposited in the ferrule chamber. In-position welding, as when welding a stud to a vertical member, gravitational forces tend to accumulate weld metal at the bottom side of the chamber and any excessive weld metal may result in an asymmetrical and relatively weak weld. I have also found that for a stud with a given weld and diameter that the minimum ratio must be increased if the length of the projection tip is reduced. With a given weld end diameter and a given ratio, reduction of length of the projection tip will ultimately produce a condition where short circuiting of the welding arc occurs.

It will be understood that in the description above, the relationship of the welding chamber in the ferrule and the welding end of the stud has been expressed in terms of diameter and that such critical relationship may be expressed in terms of cross sectional area since the area is a function of the diameter. Thus, in terms of area, the cross sectional area of the welding chamber 34 of the ferrule should lie in the range of 1.44 to 3.24 times the cross sectional area of the welding end 21 of the stud.

When welding a stud 11 embodying this invention together with a ferrule 30, it is understood that a source of welding current is available as well as a timer and contactor unit to control duration of the welding current. This welding equipment is well-known in the welding art and therefore is not shown or described. The stud 11 may be held by a stud welding gun of well-known form, the chuck of said gun holding the stud at the fastening end. A ferrule 30 may be positioned on the workpiece with the stud centered as indicated in FIG. 5a and the ferrule held by a ferrule holder (not shown). It is understood that welding end 21 of stud 11 is a non-fluxed end and that as shown in FIG. 5a projection tip 22 initially contacts a work member such as 10.

Upon closure of a starting switch, welding current begins to flow and the stud welding gun mechanism begins to lift or retract the stud from the surface of the work member. As the stud is lifted, an arc is simultaneously formed between the work member and the projection tip of the stud. The distance through which the stud is lifted is predetermined and may usually be approximately one-sixteenth of an inch. The generation of an arc between projection tip 22 and the work member melts an area on the work member opposite the projection tip and also melts the projection tip causing molten or liquid metal from tip 22 to separate from end 21 and to be transferred to the work member. A small pool 36, as shown in FIG. 5b, of molten metal, somewhat larger than the original diameter of the projection tip, and of more than superficial depth is thus formed on the work member. The heat from this small pool of molten metal preheats adjacent portions of the work member by conduction. (It will be noted that heat from the arc is confined within the ferrule and that circulation of air within the ferrule is substantially eliminated because of the solid seating of end face 31 of the ferrule on the work member.) By the time the stud has been retracted to its maximum retracted position (has moved approximately one-sixteenth of an inch), the projection tip should be just about completely melted and liquified. Preferably, complete melting of the projection tip should occur at the moment of maximum retraction or just thereafter, such timing producing a strong forceful arc between the stud and the work member. At the moment of maximum retraction and complete melting of the projection tip, it will be noted that the welding end is now spaced a distance equal to the sum of one-sixteenth of an inch retraction due to the gun mechanism and also the length of the original projection tip 22 of the stud. This sum is defined as the effective arc length of stud during the weld; such effective arc length being controlled by the length of the projection tip for a constant gun retraction. The preheating of the work member by the small pool of molten metal, the confinement of the heat of the arc, and the establishment of a strong arc during retraction, produce a condition which causes the welding end of the stud to be immersed in a centrally established arc which spreads to the full cross-sectional area of the welding end and to a corresponding area on the work member as shown in FIG. 5c. A portion (burn-off of about one-sixteenth to one-eighth of an inch) of the welding end 21 of the stud melts under the action of the arc and the work member opposed to said end is brought up to molten temperature, thereby forming an enlarged 37, as in FIG. 5c, of metal on the member directly opposite the welding end of the stud and bounded laterally by the wall of the ferrule. The enlarged molten pool thus comprises metal melted from the projection tip, from the weld end of the stud, and from the work member, such molten metal penetrating the work member to a considerable depth and being more than superficial melting of such metal.

After a predetermined time has elapsed, which is automatically controlled in well-known manner by the timer unit, the welding current flow is stopped by opening of the contactor and the stud is plunged downwardly by the stud gun mechanism into the molten and liquid pool of metal and a weld 38, as in FIG. 5d, is consummated between the stud and the work member when the molten pool solidifies. The ferrule remains around the weld area as the stud gun is lifted and the chuck of the gun is disengaged from the welded stud.

It will be noted that when stud 11 is plunged into the molten pool 37, the entire cross-section of the welding end 21 of the stud is enveloped by molten metal and becomes welded to the work member upon solidification of the molten metal. Displacement of some of the molten metal forms a fillet weld 12 which surrounds the base of the stud and is fused to both stud and work member. This fillet molded laterally by the weld chamber wall of ferrule 30 has a diameter substantially the same as that of diameter "D" of the weld chamber.

After welding, the overall length of the stud is shorter than the original overall length of the stud by an amount equal to the sum of the length of the projection tip 22 and a length of the welding end 21 defined as the "burn-off length." This shortening is caused by the displacement of most of the molten metal from the tip and the welding end of the stud as described above into the fillet. Exemplary burn-off lengths may vary from approximately one thirty-second of an inch to one-eighth of an inch for studs having weld end diameters varying from three-sixteenths of an inch to five-eighths of an inch respectively.

It is important to note that the preselected length of the projection tip of the stud serves to control the length of arc between the welding end of the stud and the molten pool of metal, after the projection tip has melted. With a given distance of retraction of the gun mechanism, the longer the projection tip, the farther away from the melted metal the welding end of the stud will be, and the longer the length of the arc will be. In other words, the length of the projection tip is directly proportional to the actual arc length between the welding end of the stud and the molten metal. This feature is new and very useful because in some applications of stud welding where a different arc length is required, the arc length may be easily changed by selecting a stud having a projection tip of different length. By a combination of a preselected internal diameter of the ferrule chamber and a preselected length of projection tip, the welding end of the stud can be made to remain far enough away from the molten metal during the entire arcing period, so that the arc is maintained in a strong unwavering manner. Short circuting to the work member is thus prevented, a condition which would cause the stud to prematurely solidify to the work member. I have found that by using this welding method with a projection tipped welding stud, and an exemplary ferrule of the type described, that even in welding studs having a diameter greater than a quarter of an inch a welding flux was not necessary to obtain sound welds. Initiation of the arc is strong and forceful at the projection tip because of the high current density occurring on the small section of the tip throughout its length. All of these factors contribute to consistently strong, sound welds under a wide range of welding energy conditions.

In FIG. 6 is illustrated a different modification of a ferrule and stud combination embodying this invention. In FIG. 6, a stud 11' includes an unfluxed weld end portion 21' provided with a projection tip 22'. The ferrule 30' may comprise an open ended cylindrical wall 30a defining a weld chamber 34' having a diameter D'. The top open end of the cylindrical wall 30a' defines an axial opening 33' adapted to loosely receive the shank of the stud 11'. The projection tip 22' is constructed as described above and the diameter D' is related to the diameter of the weld end 21' as above described. It will thus be readily apparent that the ferrule 30' may not include a radially inwardly extending flange or lip as in the prior modification in the event the welding end of the stud construction is modified to provide reduced welding end portion 21'. The relationships between the welding stud, ferrule, and projection tips on the weld end portion of the stud described in the prior modification obtain with respect to the modification shown in FIG. 6, and such a stud and ferrule combination may be employed with the method of the invention described above.

It is understood that various modifications and changes may be made in the welding method described above, and all such changes and modifications coming within the scope of the apepnded claims are embraced thereby.

I claim:

1. An article of manufacture comprising: an unfluxed welding stud for use in an arc welding process, said stud including a shank having at one end a welding end portion to be melted during welding and including a projection tip and an adjacent shank portion, said projection tip being of predetermined length and cross-sectional area and having a volume related to the volume of the shank portion and a length related to the cross-sectional area of the shank portion whereby during an arc welding process said projection tip and shank portion are separated from the shank as liquid weld metal and provide weld metal externally of the shank.

2. A welding stud as stated in claim 1 wherein the volume of said projection tip is 10% or less of the sum of the volumes of said tip and said shank portion.

3. A welding stud as stated in claim 1 wherein the length of said shank portion is at least ⅟₃₂nd of an inch.

4. An unfluxed welding stud for welding to a metallic member by an arc welding process, said stud including a projection tip and an adjacent stud shank portion integral therewith, the length of said projection tip being proportional to the actual arc length drawn during the arc welding process between the shank portion and liquid metal on said metallic member provided by melting and complete separation of the projection tip from the shank portion as liquid weld metal, and whereby liquid metal from said projection tip and said shank portion substantially provides a fillet of weld metal on said metallic member.

5. An unfluxed welding stud for welding to a metallic member by an arc welding process, said stud including a shank having at one end a welding end portion including a projection tip and an adjacent shank portion, said projection tip having a volume of metal related to the volume of metal of said shank portion whereby initial deposit of said projection tip as liquid metal upon said metallic member and later deposit of said shank portion as liquid metal on said metallic member provides a weld having deep penetration of said metallic member.

6. A welding stud for use in an arc welding process in which an arc is drawn between a workpiece and the stud and metal of the stud is melted to form a pool of liquid metal on the workpiece, comprising: a stud end having a welding portion of selected cross-sectional area and a tip projecting from said welding portion and of reduced cross-sectional area, said tip having a tip length proportional to the length of the arc to be drawn, said tip having a volume of metal related to the volume of metal in said welding portion, said tip length and volume relation providing a strong, unextinguishable arc during the arcing period, said welding portion and tip being melted to liquid metal and providing weld metal externally of the stud.

7. A welding stud for use in an arc welding process in which an arc is drawn between a workpiece and the stud, and metal of the stud is melted to form a pool of liquid metal on the workpiece, comprising: a stud end having a welding portion of selected cross-sectional area and a tip portion of reduced uniform cross-sectional area projecting from said welding portion, said tip portion having a tip length proportional to the length of the arc to be drawn and related to the volume of the welding portion to be melted and separated whereby an arc is centrally established on said welding portion, said tip length and volume of metal to be melted on said welding portion providing a strong, uninterrupted arc during the arcing period, the liquid metal from said welding and tip portions providing weld metal externally of the stud.

References Cited in the file of this patent

UNITED STATES PATENTS

| | | |
|---|---|---|
| 1,121,619 | Ellery | Dec. 22, 1914 |
| 2,518,463 | Graham | Aug. 15, 1950 |
| 2,878,363 | Shoup et al. | Mar. 17, 1959 |